Figure 1:
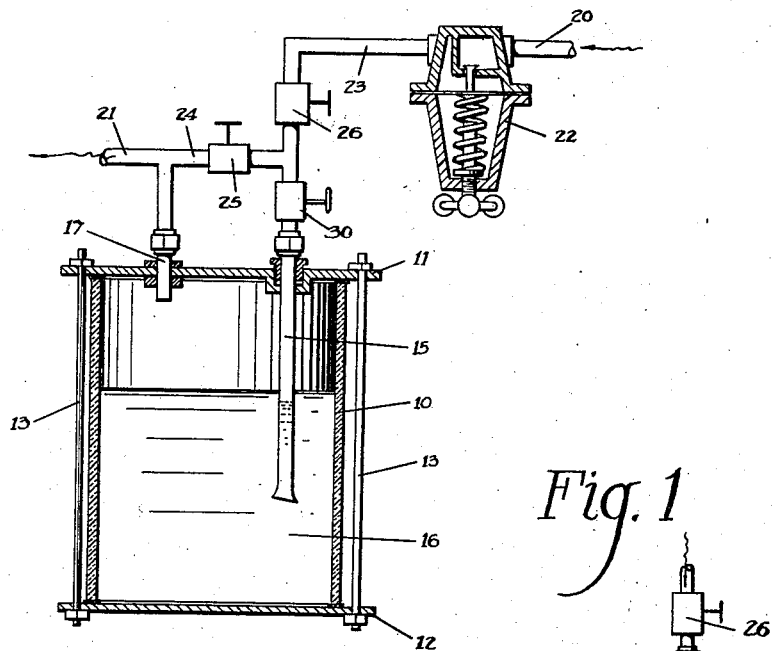

March 23, 1937. C. F. WALLACE ET AL 2,074,950
APPARATUS FOR METERING GAS
Filed March 2, 1932

INVENTOR
Charles F. Wallace & Gerald D. Peet
BY
Arthur L. Kents
ATTORNEY.

Patented Mar. 23, 1937

2,074,950

UNITED STATES PATENT OFFICE 2,074,950

APPARATUS FOR METERING GAS

Charles F. Wallace, Westfield, and Gerald D. Peet, Montclair, N. J., assignors to Wallace & Tiernan Company, Inc., Belleville, N. J., a corporation of New York Application March 2, 1932, Serial No. 596,308

3 Claims. (Cl. 73—194)

This invention relates to apparatus for metering gas. For metering small volumes of gas it is customary to use volumetric meters, that is, meters in which the gas is caused to pass through a body of liquid in separated volumes of known size or amount so that the amount of gas flowing is shown by the passage of successive measured unit volumes of gas in a unit of time. Two kinds of volumetric meters are in common use, that is, bubbling meters in which a small flow of gas is discharged into a body of liquid and rises to the surface of the liquid in separated bubbles which are of known volume dependent on the properties of the gas and the liquid, and pulsating, or syphon, meters in which successively collected volumes of the flowing gas are discharged and permitted to escape through the body of liquid. Volumetric flow meters have the disadvantages that a liquid must be used which will not react with the gas and that as the result of evaporation of the liquid the body of liquid in the meter must be replenished from time to time. These difficulties are especially bothersome in the use of volumetric meters for measuring the flow of chlorine gas.

Due to the chemically reactive nature of chlorine gas, very few liquids are suitable for use in a volumetric flow meter used for measuring the flow of chlorine gas. Those which have been found most satisfactory are concentrated sulfuric acid, concentrated phosphoric acid, distilled water and carbon tetrachloride. Chlorine gas reacts but little, if any, with sulfuric acid, but the use of sulfuric acid in volumetric meters for measuring the flow of chlorine gas is attended with dangers which make it unsatisfactory for this purpose. Phosphoric acid for this purpose has the disadvantage that as the result of continued contact with dry chlorine gas it loses water and becomes solid. Water used as the meter liquid in a volumetric flow meter evaporates, requiring to be renewed from time to time, and is liable to freeze if the meter is exposed to sufficiently low temperature. The use of solutions of salts in water avoids the danger of freezing, but as the water evaporates from the solution the salts are deposited as solids.

Carbon tetrachloride meets all the requirements but one of a liquid for use in volumetric flow meters as such meters have been used heretofore. It does not react with dry chlorine gas; it is not dangerously poisonous; and it does not corrode metal parts. It has, however, a low boiling point and high vapor tension, and being thus highly volatile, it is rapidly carried away by the chlorine gas passing through it, so that the meter becomes inoperative in a comparatively short time unless the supply of the liquid is renewed at frequent intervals.

The object of the present invention is to provide means for supplying gas at a desired rate with the use in a volumetric flow meter of liquid carbon tetrachloride or other suitable highly volatile liquid with such small loss of liquid through evaporation that replenishing of the liquid is required only at long intervals. To this end the invention comprises an apparatus wherein instead of having the gas flow continuously through a body of liquid as in the customary manner of operating volumetric meters, the gas is caused to flow through the body of liquid in the metering chamber for a short period from time to time to measure the rate of flow of the gas, and in the intervals between such metering or measuring of the flow the gas is by-passed around the body of liquid. During the metering periods the rate of flow of the gas may be adjusted to the desired flow rate, and during the intervening periods the flow of the gas through the by-pass passage may be indicated by causing the drop in pressure through the by-pass to be indicated by the depressed liquid level in a tube leading into the body of liquid in the meter chamber from the inlet end of the by-pass.

A full understanding of the invention can best be given by describing an apparatus embodying the invention, and such a description will now be given in connection with the accompanying drawing, in which:—

Figure 2:
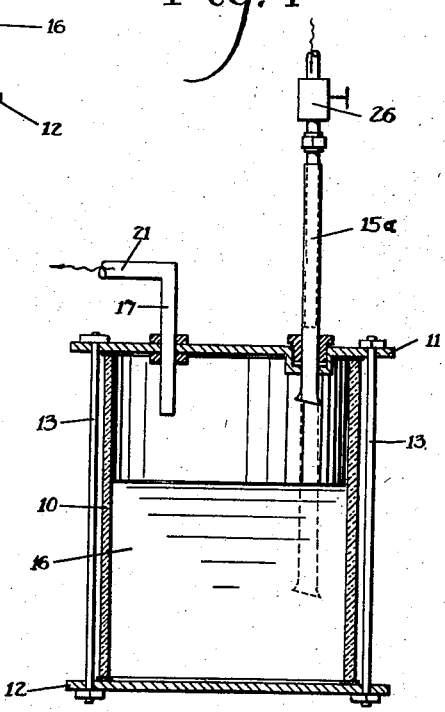

Fig. 1 is a view partly in section of such an apparatus comprising a simple form of volumetric meter of the bubbling type; and Fig. 2 is a similar view illustrating a modified construction.

Referring to the drawing, and first to Fig. 1:—
The apparatus as shown in this figure comprises a bubbling meter of conventional form in which a glass cylinder 10 is closed at its ends by a top plate 11 and a bottom plate 12 held against the ends of the cylinder by tie rods 13. Extending through the top plate 11 is an inlet tube 15 the lower end of which extends down into a body of liquid 16 in the meter chamber and an outlet 17 leading through the top plate 11 from the gas space within the meter chamber above the liquid. The meter is connected in a gas flow, or supply, line, the parts of which shown include a tube 20 leading from a source of supply of chlorine gas under pressure and a tube 21 leading or connected to the point of use or discharge of the gas. The supply line includes, as shown, a pressure reducing valve 22 which may be assumed to be adjustable as is customary for varying the pressure under which the gas flows therefrom. The pressure reducing valve 22 is connected by pipe 23 to the inlet tube 15 of the meter, and the discharge tube 21 is connected to the meter outlet 17. A tube 24 connects directly from the tube 23 to the tube 21, thus providing a by-pass passage for by-passing the gas around, or past, the meter. This by-pass tube is controlled by a shut-off valve 25. A control valve 26 is provided for regulating the rate of flow of the gas through the supply line. This valve is shown as being in the connecting tube 23, that is, between the reducing valve and the meter, but it might obviously be in the tube 21, that is, at a point in the supply line beyond the meter. When the pressure reducing valve is of the type shown in the United States patents to Wallace Nos. 1,285,491 or 1,285,492, adjustment of this valve may serve for regulating the gas flow rate, making a separate control valve unnecessary.

When the by-pass valve 25 is closed, gas flowing through the supply line all passes through the meter, being discharged from the inlet tube 15 into the body of liquid 16 and rising through the liquid in separated bubbles which may be counted and are of known volume dependent on the density of the gas and of the liquid. When the by-pass valve is open, however, the flow resistance through the by-pass being slightly less than the flow resistance through the meter, there will be no further flow through the meter but all the gas will pass through the by-pass.

In the use of the apparatus, a flow of gas being established through the supply line and the by-pass valve 25 being closed, the rate of flow will be shown by bubbles rising through the liquid 16. The rate of flow may then be adjusted by means of the control valve 26 until the desired flow rate is established. Then by opening the by-pass valve the flow is diverted from the meter through the by-pass tube 24. No gas will then pass through the meter until, when it is again desired to read the flow of gas, the by-pass valve 25 is closed. The meter may thus be used intermittently, or from time to time, for showing the rate of flow of the gas, and in connection with the control valve 26, for adjusting the flow rate; and between such measurings the flow, by opening the valve 25, is by-passed around the meter, and during such by-passing intervals or periods there is no flow of gas through the meter and consequently no evaporation of the meter liquid.

By making the meter inlet tube 15 of glass or other suitable transparent material the liquid level within the tube during the by-pass periods may be viewed, and because of the drop in pressure across the by-pass the liquid will be depressed in the tube below the surface of the main body of liquid in the meter chamber, and the liquid level in the tube will indicate the drop in pressure across the by-pass. The lower liquid level in the tube 15 below the level of the body of liquid 16 will thus show that the flow of gas through the by-pass tube 24, and therefore through the supply line, is being maintained, and that the flow conditions have not substantially changed.

If desired, a shut-off valve 30 may be provided between the meter and the inlet end of the by-pass tube 24, as shown. Usually, however, this valve will not be required, and even if provided will not be closed when it is desired to have the indication of flow through the by-pass given by the depressed liquid level in the inlet tube 15.

With the gas passing through the meter only for short and, as it may be, more or less widely separated intervals, the amount of evaporation of the meter liquid is very small as compared to that which takes place in the customary use of a bubbling or other volumetric meter, and because of this small evaporation, liquid carbon tetrachloride or other suitable highly volatile liquid may be used in a volumetric meter for measuring the flow of chlorine gas and the meter used for very long periods of time without refilling or changing the liquid. And similarly, in meters for measuring the flow of other gases, any suitable highly volatile liquid may be used.

Fig. 2 shows a modified construction whereby, instead of by-passing the gas past the meter, the gas may be caused to flow over the body of liquid in the meter chamber, that is, may be by-passed about the body of liquid. For this purpose the meter inlet tube 15a is formed as a telescoping tube so that the discharge end of the tube may be lowered to the position shown by dotted lines or raised to that shown by full lines. When the tube is in the lowered position, the meter will operate, the gas being discharged into and bubbling up through the liquid. When the tube is raised to the full line position, the gas will be discharged into the space above the liquid and will pass directly to the outlet 17 and thence to the supply tube 21, being thus by-passed past the body of liquid.

What is claimed is:

1. Gas measuring apparatus, comprising a volumetric flow meter in which the flow of gas being measured is caused to pass in separated volumes through a body of volatile liquid, adjusting means for adjusting the rate of flow of the gas, a by-pass connection for by-passing the gas around the meter, and means for directing the flow of gas through the meter or through the by-pass, said apparatus including means for indicating substantial change in the rate of flow of the gas when the flow is directed through the by-pass.

2. Gas measuring apparatus, comprising a volumetric flow meter in which the flow of gas being measured is caused to pass in separated volumes through a body of volatile liquid, adjusting means for adjusting the rate of flow of the gas, a by-pass connection for by-passing the gas around the meter, and means for directing the flow of gas through the meter or through the by-pass, said apparatus including pressure indicating means for indicating the flow of gas when the flow is directed through the by-pass.

3. Gas measuring apparatus, comprising a volumetric flow meter of the bubbling type having a container, a body of liquid partly filling the container, a gas inlet tube extending downward into the liquid, a gas outlet tube leading from the space in the container above the liquid, a by-pass connection between the inlet tube and the outlet tube, and means for opening and closing the by-pass, the lower end portion of the inlet tube being transparent, and the wall of the container being transparent to permit the lower end portion of the inlet tube to be viewed.

CHARLES F. WALLACE.
GERALD D. PEET.